(12) United States Patent
Springer et al.

(10) Patent No.: US 8,885,969 B2
(45) Date of Patent: Nov. 11, 2014

(54) METHOD AND APPARATUS FOR DETECTING CODING ARTIFACTS IN AN IMAGE

(75) Inventors: Paul Springer, Stuttgart (DE); Frank Moesle, Stuttgart (DE); Zhichun Lei, Stuttgart (DE); Matthias Brueggemann, Bueren (DE)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 13/053,828

(22) Filed: Mar. 22, 2011

(65) Prior Publication Data
US 2011/0235921 A1 Sep. 29, 2011

(30) Foreign Application Priority Data

Mar. 29, 2010 (EP) .................................. 10158214

(51) Int. Cl.
*H04N 5/00* (2011.01)
*H04N 1/32* (2006.01)
(Continued)

(52) U.S. Cl.
CPC *H04N 19/00909* (2013.01); *G06T 2207/10016* (2013.01); *H04N 7/26276* (2013.01); *H04N 7/26058* (2013.01); *G06T 5/002* (2013.01); *H04N 7/26127* (2013.01); *G06T 2207/20021* (2013.01); *G06K 9/4604* (2013.01); *G06T 7/0091* (2013.01); *H04N 7/26255* (2013.01); *H04N 7/26888* (2013.01); *H04N 7/26244* (2013.01)

USPC ........... 382/268; 382/275; 382/257; 382/224; 382/190; 358/426.01; 348/607

(58) Field of Classification Search
USPC ........................ 358/1.9, 3.27, 426.01–426.16
See application file for complete search history.

(56) References Cited

U.S. PATENT DOCUMENTS

| 5,883,983 A | 3/1999 | Lee et al. |
|---|---|---|
| 7,076,113 B2 | 7/2006 | Le Dinh |

(Continued)

FOREIGN PATENT DOCUMENTS

| EP | 1 209 624 A1 | 5/2002 |
|---|---|---|
| EP | 2 226 760 A1 | 9/2010 |

OTHER PUBLICATIONS

Extended European Search Report issued on Jun. 27, 2011 in corresponding European Application No. 11 15 9355.

(Continued)

*Primary Examiner* — Randolph I Chu
*Assistant Examiner* — Nathan Bloom
(74) *Attorney, Agent, or Firm* — Oblon, Spivak, McClelland, Maier & Neustadt, L.L.P.

(57) ABSTRACT

The present invention relates to a method and a corresponding apparatus for detecting coding artifacts in an image. The proposed apparatus comprises an edge position detector that detects an edge position of an edge in said image, a border position detector that detects a border position of a border between a texture area and a flat area in said image, and an artifact position defining unit that defines the area between said edge position and said border position as artifact area potentially comprising coding artifacts.

17 Claims, 8 Drawing Sheets (51) Int. Cl.

| | |
|---|---|
| *H04N 1/41* | (2006.01) |
| *G06K 9/62* | (2006.01) |
| *G06K 9/40* | (2006.01) |
| *G06K 9/42* | (2006.01) |
| *G06K 9/44* | (2006.01) |
| *G06K 9/46* | (2006.01) |
| *G06K 9/66* | (2006.01) |
| *H04N 19/17* | (2014.01) |
| *H04N 19/117* | (2014.01) |
| *G06T 5/00* | (2006.01) |
| *H04N 19/136* | (2014.01) |
| *G06T 7/00* | (2006.01) |
| *H04N 19/86* | (2014.01) |
| *H04N 19/182* | (2014.01) |
| *H04N 19/176* | (2014.01) |

(56) References Cited

U.S. PATENT DOCUMENTS

| | | | | |
|---|---|---|---|---|
| 7,590,280 | B2* | 9/2009 | Tanaka | 382/151 |
| 2002/0118399 | A1 | 8/2002 | Estevez et al. | |
| 2005/0265623 | A1 | 12/2005 | Estevez et al. | |
| 2006/0050783 | A1* | 3/2006 | Le Dinh et al. | 375/240.2 |
| 2006/0245506 | A1 | 11/2006 | Lin et al. | |
| 2007/0071095 | A1* | 3/2007 | Lim | 375/240.08 |
| 2007/0081596 | A1 | 4/2007 | Lin et al. | |
| 2008/0152017 | A1 | 6/2008 | Vendrig et al. | |
| 2008/0292275 | A1* | 11/2008 | Peng | 386/109 |
| 2009/0041373 | A1 | 2/2009 | Incesu et al. | |
| 2010/0002951 | A1* | 1/2010 | Zhai et al. | 382/266 |
| 2010/0245672 | A1 | 9/2010 | Erdler et al. | |

OTHER PUBLICATIONS

Hantao Liu et al., "Perceptually Relevant Ringing Region Detection Method", EUSIPCO2008 The 16$^{th}$ European Signal Processing Conference, Aug. 25, 2008, XP 002638092, 5 Pages.

U.S. Appl. No. 13/886,807, filed May 3, 2013, Springer, et al.

U.S. Appl. No. 13/887,021, filed May 3, 2013, Springer, et al.

European Office Action issued Aug. 14, 2012 in Patent Application No. 11 159 355.4.

S. H. Oguz, et al., "Image coding ringing artifact reduction using morphological post-filtering", http://ieeexplore.ieee.org/xpls/abs_all.jsp?arnumber=739051, Dec. 7-9, 1998, 6 pages.

Seungjoon Yang, et al., "Maximum-Likelihood Parameter Estimation for Image Ringing-Artifact Removal", IEEE Transactions on Circuits and Systems for Video Technology, vol. 11, No. 8, http://circuit.ucsd.edu/~nguyent/Nguyen/00937440.pdf, Aug. 8, 2001, pp. 963-973.

Hao-Song Kong, et al., "Edge Map Guided Adaptive Post-Filter for Blocking and Ringing Artifacts Removal", MERL—A Mitsubishi Electric Research Laboratory, http://www.merl.com/reports/docs/TR2004-003.pdf, TR-2004-003, Feb. 2004, 6 pages.

John Canny, "A Computational Approach to Edge Detection", IEEE Transactions on Pattern Analysis and Machine Intelligence, vol. PAMI-8, No. 6, Nov. 1986, pp. 679-698.

* cited by examiner

METHOD AND APPARATUS FOR DETECTING CODING ARTIFACTS IN AN IMAGE

CROSS-REFERENCE TO RELATED APPLICATIONS

The present application claims priority of European patent application 10 158 214.6 filed on Mar. 29, 2010.

FIELD OF THE INVENTION

The present invention relates to a method and an apparatus for detecting coding artifacts in an image. Further, the present invention relates to a method and an apparatus for reducing coding artifacts in an image. Still further, the present invention relates to a computer program and a computer readable non-transitory medium. Finally, the present invention relates to a device for processing and/or displaying an image.

BACKGROUND OF THE INVENTION

The distribution of video content is nowadays not only possible via the traditional broadcast channels (terrestric antenna/satellite/cable), but also via internet or data based services. In both distribution systems the content may suffer a loss of quality due to limited bandwidth and/or storage capacity. Especially in some internet based video services as video portals (e.g. YouTube™) the allowed data rate and storage capacity is very limited. Thus, the resolution and frame rate of the distributed video content may be quite low. Furthermore, lossy source coding schemes may be applied to the video content (e.g. MPEG2, H.263, MPEG4 Video, etc.), which also negatively affect the video quality and lead to losses of some essential information (e.g. textures or details).

A lot of source coding schemes are based on the idea to divide an image into several blocks and transform each block separately to separate relevant from redundant information. Only relevant information is transmitted or stored. A widely used transformation is the discrete cosine transform (DCT). As two consecutive frames in a video scene do in most cases not differ too much, the redundancy in the temporal direction may be reduced by transmitting or storing only differences between frames. The impact of such lossy coding schemes may be visible in the decoded video if some relevant information is not transmitted or stored. These visible errors are called (coding) artifacts.

There are some typical coding artifacts in block based DCT coding schemes. The most obvious artifact is blocking: The periodic block raster of the block based transform becomes visible as a pattern, sometimes with high steps in amplitude at the block boundaries. A second artifact is caused by lost detail information and is visible as periodic variations across object edges in the video content (ringing). A varying ringing in consecutive frames of an image sequence at object edges may be visible as a sort of flicker or noise (mosquito noise).

Coding artifacts are not comparable to conventional errors such as additive Gaussian noise. Therefore, conventional techniques for error reduction and image enhancement may not be directly transferred to coding artifact reduction. While blocking is nowadays reduced by adaptive low-pass filters at block boundaries (either in-the-loop while decoding or as post-processing on the decoded image or video), ringing and mosquito noise are more difficult to reduce, since the applied filtering must not lower the steepness of edges in the image content.

One of the main tasks of an adequate method for artifact reduction is the preservation of details while the artifacts ought to be strongly reduced. Therefore, the area where the artifacts occur should be strongly filtered, while in textured areas the details should not be removed by a too strong filtering. As coding artifacts often have similar characteristics as textures, the detection of these areas is not straightforward.

BRIEF SUMMARY OF THE INVENTION

It is an object of the present invention to provide a fast, simple and reliable method and an apparatus for detecting coding artifacts in an image. It is a further object of the present invention to provide a corresponding method and apparatus for reducing coding artifacts in an image and a corresponding device for processing and/or displaying an image. Still further, it is an object of the present invention to provide a corresponding computer program for implementing said methods and a computer readable non-transitory medium.

According to an aspect of the present invention there is provided a method for detecting coding artifacts in an image, comprising the steps of:
    detecting an edge position of an edge in said image,
    detecting a border position of a border between a texture area and a flat area in said image, and
    defining the area between said edge position and said border position as artifact area potentially comprising coding artifacts.

The present invention is based on the idea to determine the area(s) with in the image, i.e. the so-called artifact area(s), where the occurrence probability of coding artifacts, in particular of ringing artifacts and/or mosquito noise, is high. For this purpose edges, in particular prominent edges, are determined, since it has been recognized that in the vicinity of prominent edges those artifacts occur. Further, according to the present invention borders between texture areas and flat areas are determined, those texture areas including potential artifacts. The areas between those determined edge positions and said border positions are then defined as artifact areas, which potentially comprises coding artifacts. In this way, those artifact areas can be quickly and reliably determined with only a low amount of processing capacity.

According to a further aspect of the present invention there is provided a method for reducing coding artifacts in an image, comprising the steps of:
    block noise filtering the image for reducing block noise in the image,
    detecting coding artifacts in the block noise filtered image according a method as proposed according to the present invention to obtain information about one or more artifact areas in said image, and
    reducing coding artifacts in said block noise filtered image by applying a step of mosquito noise reduction and/or deringing to only the detected artifact areas of the image.

According to a further aspect of the present invention there is provided a device for processing and/or displaying images, in particular a camera, TV-set, computer, broadcast unit or video player, comprising an apparatus for detecting coding artifacts as proposed according to the present invention.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that the claimed methods, devices, computer program and computer readable medium have similar and/or identical preferred embodiments as the claimed method for detecting coding artifacts and as defined in the dependent claims.

BRIEF DESCRIPTION OF THE DRAWINGS

These and other aspects of the present invention will be apparent from and explained in more detail below with reference to the embodiments described hereinafter. In the following drawings FIG. 1 schematically shows an embodiment of an apparatus for reducing coding artifacts according to the present invention, FIG. 2 schematically shows a first embodiment of an apparatus for detecting coding artifacts according to the present invention.

DETAILED DESCRIPTION OF THE INVENTION

Figure 1:
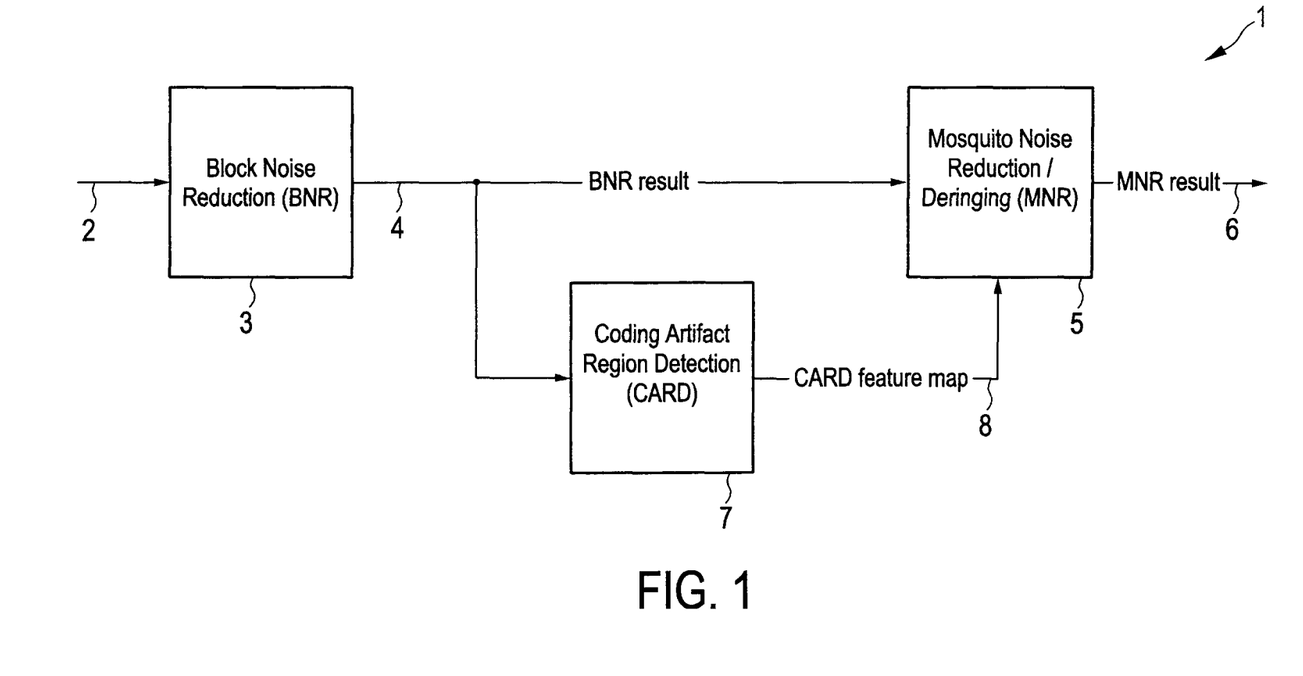

FIG. 1 shows a block diagram showing an exemplary embodiment of an apparatus 1 for reducing coding artifacts in an image (or a video signal comprising a single image or a sequence of images) according to the present invention. The apparatus 1 comprises a block noise filter 3 for filtering discontinuous boundaries within the input image 2 and a mosquito noise reduction and/or deringing filter 5 for reduction of mosquito noise and/or ringing artifacts from the filtered image 4. Further, the filtered image 4 is provided to a detection unit 7 for detection of coding artifacts in the filtered image 4. The output information 8 of said detection unit 7 is then also provided to the mosquito noise reduction and/or deringing filter 5 so that the filtering applied therein is not applied to the complete filtered image 4 but only to selected artifact areas, which are detected by said detection unit 7. The processed image 6 is the output by the mosquito noise reduction and/or deringing filter 5.

The block noise filter 3 for block noise reduction (BNR) can be any type of, for example, low-pass filter which is adapted to reduce blocking artifacts. Preferably, a local adaptive low-pass filtering only across block boundaries is carried out. The reason for this pre-processing is the smoothing of discontinuities at block boundaries and to protect edges and details as far as possible. Further, in view of the discrimination between flat areas and texture areas, which is performed in the detection unit 7, as will be explained below, said pre-processing guarantees correct detection results. Any common de-blocking scheme can be used as block noise reduction algorithm, in particular adaptive schemes with a short filter for detailed areas, a long filter for flat areas and a fallback mode are preferred.

The mosquito noise reduction (MNR) and/or deringing filter 5 (generally also called "coding artifacts reduction unit", which can also be regarded as a regularizer, generally smoothes the filtered image. By combining the step of filtering by the block noise filter 3 with the step of smoothing the filtered image 4 by the coding artifacts reduction unit 5, an image with a higher quality compared to known methods is achieved. The processed output image 6 is much more appealing than a deblocked image 4 alone, since remaining blocking after the deblocking stage and ringing artifacts/mosquito noise are reduced without blurring edges in the video content. Therefore, the proposed coding artifact reduction method is appropriate to enhance video material with low resolution and low data rate, since the processing may be carried out aggressively to reduce many artifacts without suffering blurring in essential edges in the image.

Such a scenario, i.e. providing the filters 3 and 5 in sequence, and details thereof are described in European patent application 09 154 206.8 and in U.S. patent application Ser. No. 12/715,854. The description of those details and embodiments of the particular units provided in this application are herein incorporated by reference, but are not further described here in detail.

According to the present invention this scenario is extended with a coding artifact detection unit (also called "coding artifact region detection" (CARD)) 7. The output 8 of said artifact detection unit 7 is provided as additional input to the coding artifacts reduction unit 5 to limit the filtering in this unit 5 to the detected artifact areas. Thus, the coding artifacts reduction unit 5 is only processing artifact areas defined by said artifact detection unit 7, resulting in a higher probability for the preservation of details and textured areas.

Especially for ringing artifacts it is very difficult to distinguish whether they belong to a textured region or are just artifacts that should be removed. Therefore, the approach for detecting the artifact area according to the present invention aims at finding the area (called "artifact area") where the probability for the occurrence of ringing artifacts (and/or mosquito noise) is very high.

Ringing artifacts are mainly caused by strongly quantized high frequency coefficients at edge blocks that are needed to correctly describe the shape of the edge. It has been recognized that they are located close to an edge and become more prominent the steeper the edge is. Furthermore, it has been recognized that these artifacts only become visible if there are no other textures at the image positions where the artifacts occur. They primarily become visible at the transition of an edge to a flat area. In textured regions, however, these artifacts are masked by the high frequency content.

Figure 2:
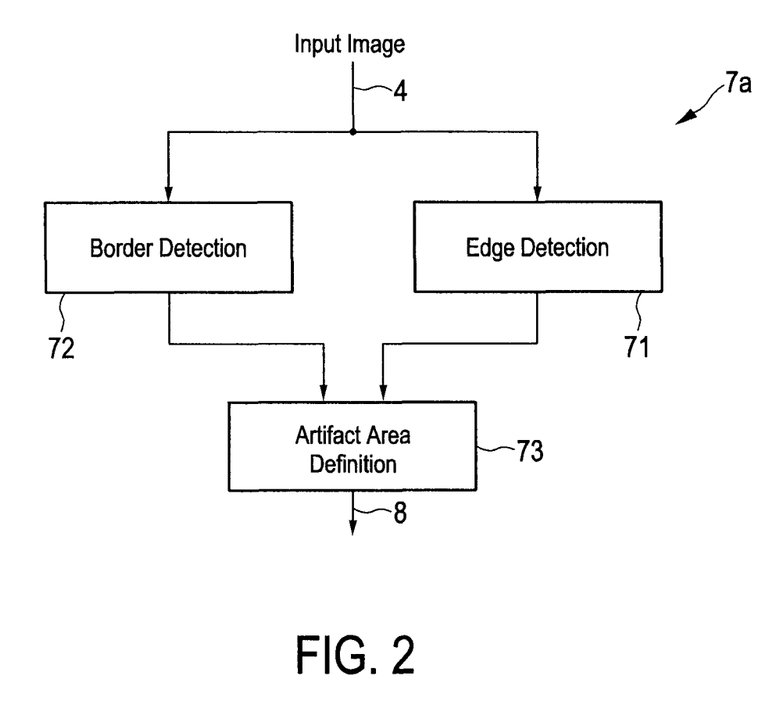

The method for coding artifact detection proposed according to the present invention is directed to an estimation of the probable artifact area. A schematic block diagram of a first embodiment 7a of a corresponding coding artifact detection unit 7 is depicted in FIG. 2. Said coding artifact detection is based on a subdivision of the image into flat and texture areas and the detection of positions of (particularly stronger, i.e. steeper) edges. Hence, the detection unit 7a comprises an edge position detector 71 that detects an edge position of an edge in said input (filtered) image 4, a border position detector 72 that detects a border position of a border between a texture area and a flat area in said input (filtered) image 4, and a artifact area defining unit 73 that defines the area between said edge position and said border position as artifact area potentially comprising coding artifacts.

Figure 3A:
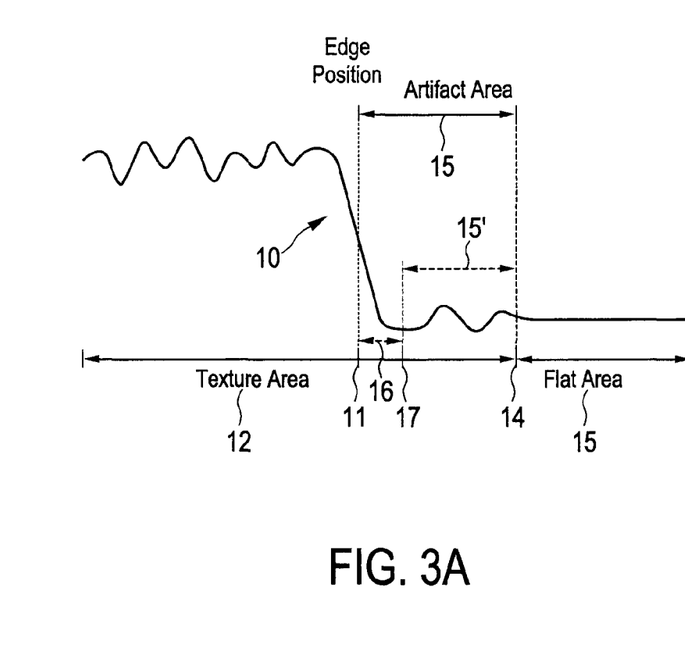
FIG. 3 shows a diagram illustrating the various positions and areas defined according to the present invention, FIG. 4 schematically shows a second embodiment of an apparatus for detecting coding artifacts according to the present invention.
Figure 3B:
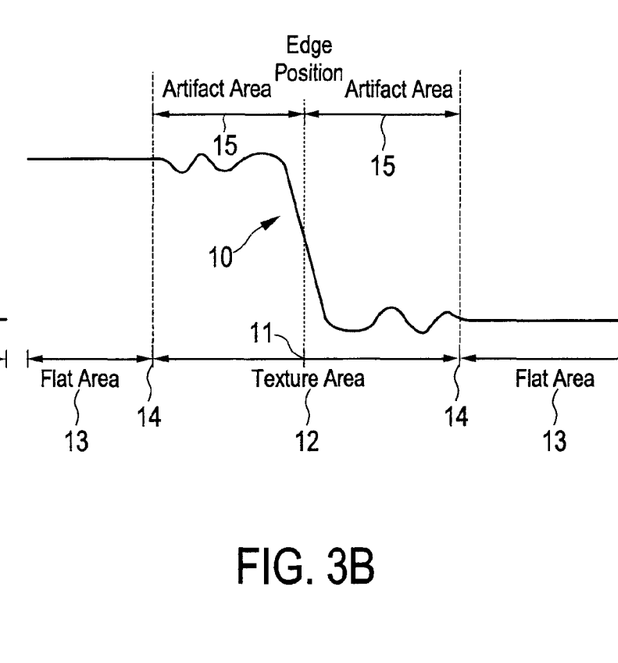

The typical areas for the occurrence of visible ringing artifacts and mosquito noise and the potential results for a flat versus texture discrimination and an edge detection are depicted in FIG. 3 showing the one-dimensional distribution of the pixel values (amplitudes) of an image. Therein, an edge 10 and the determined edge position 11 are shown. Further, a texture area 12, one (FIG. 3A) or two (FIG. 3B) flat area(s) 13 and the determined border position(s) 14 between said texture area 12 and said flat area(s) 13 are shown. According to the first embodiment of the present invention the area between said edge position 11 and said border position(s) 14 are defined as artifact area(s) 15.

As mentioned, FIG. 3 shows a one-dimensional distribution of pixel values. In practice, generally the pixel values are distributed two-dimensionally, e.g. in two perpendicular directions of a Cartesian grid, and the method of the present invention can be equally applied on such two-dimensional distributions. For instance, the edge position(s) and the border position(s) are generally determined within said two-dimensional distribution, and the artifact area(s) is (are) not only determined in one direction, but their two-dimensional distribution can be determined as well according to the present invention.

For edge detection known detection techniques can be applied. One example is the generally known Canny edge detection algorithm as, for instance, described in Canny, J., A Computational Approach To Edge Detection, IEEE Trans. Pattern Analysis and Machine Intelligence, 8:679-698, 1986, which description is herein incorporated by reference. The Canny edge detection method can be adapted well to input material of different quality (e.g. bit rate, quantization, etc.). Further, this method delivers an optimal detection rate, good localization and minimal response with respect to false positives.

In a different embodiment with less computational complexity a known Sobel operator based edge detection can be used instead for edge detection. Although this method does not deliver very precise localization of edge regions it is robust against noise in the source material and can be implemented very efficiently. Another possible candidate for edge detection is the Marr-Hildreth Operator (also known as Laplacian of Gaussian Operator), which is a special representation of a discrete Laplacian filter kernel.

For the proposed artifact detection method it is advantageous to use a robust flat versus texture (FT) discrimination, for which known methods can be applied. For instance, the discrimination can be performed by the method described in US 2009/0041373 A1, which description is herein incorporated by reference. According to this method a multi-scale or multi-resolution measurement is performed with respect to the image. Alternatively or additionally, the image is analyzed by using a prior measured noise value and a local variance value in or with respect to the image.

However, other methods can be used as well. For instance, a less computationally complex method can be used, according to which in a first step a local activity measure of an edge map is calculated and in a second step a binary map is calculated, using a threshold comparison of the activity measure, where, for instance, 0 (meaning activity is below threshold level) describes flat area and 1 describes texture area.

Figure 4:
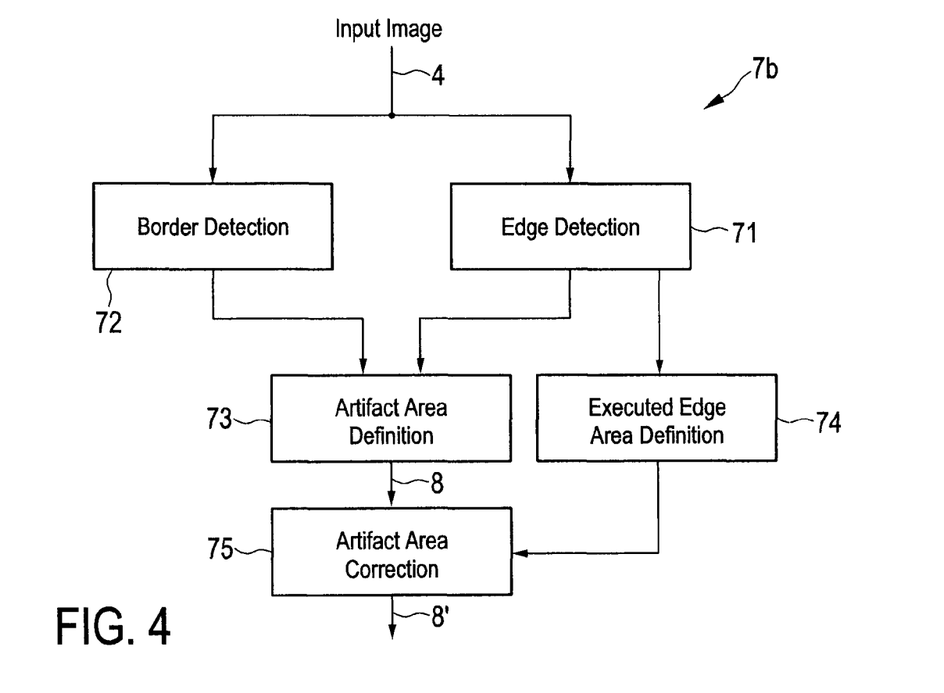

A schematic block diagram of a second embodiment 7b of the coding artifact detection unit 7 is depicted in FIG. 4. The elements 71 to 73 of said detection unit 7b are identical to the elements 71 to 73 of the first embodiment of the detection unit 7a and will thus not be explained again. In addition, however, an excluded edge area is defined, which covers the area (indicated by reference numeral 16 in FIG. 3A, as an example) from the detected edge position 11 to the end 17 of the corresponding edge 10. This excluded edge area 16 is then excluded from the artifact area 15 (or, more precisely, from the output information 8 indicating the artifact area 15) defined by the artifact area defining unit 73 by the artifact area correction unit 75 resulting in the corrected artifact area 15' (or, more precisely, in corrected output information 8' indicating the corrected artifact area 15'). This corrected output information 8' is then—in the embodiment shown in FIG. 1—provided to the filter 5 or to any other further processing as required.

By this embodiment it is ensured that the edge 10 itself is excluded from the artifact area which would then be the area 15' indicated in FIG. 3A so that any further processing, e.g. a filtering of mosquito noise or ringing artifacts is not applied to the edge 10 itself which might lead to a degradation of an image in this area, although this is not desired.

In general, the characteristics of ringing artifacts are quite similar to texture characteristics. Therefore, by the methods for flat versus texture discrimination used according to the present invention, these artifacts are generally assigned to the texture area and are positioned near to the border of the detected flat area.

Figure 5:
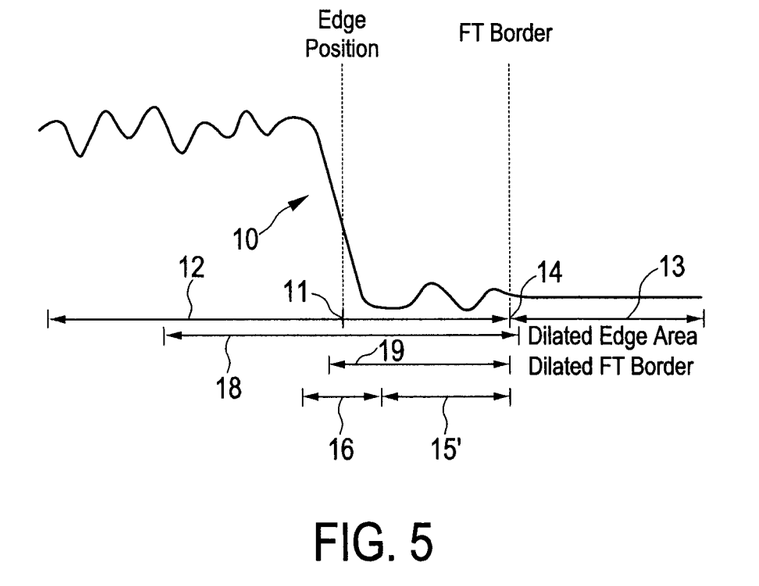
FIG. 5 shows another diagram illustrating positions and areas defined according to a further embodiment of the present invention, FIG. 6 schematically shows a third embodiment of an apparatus for detecting coding artifacts according to the present invention.
Figure 6:
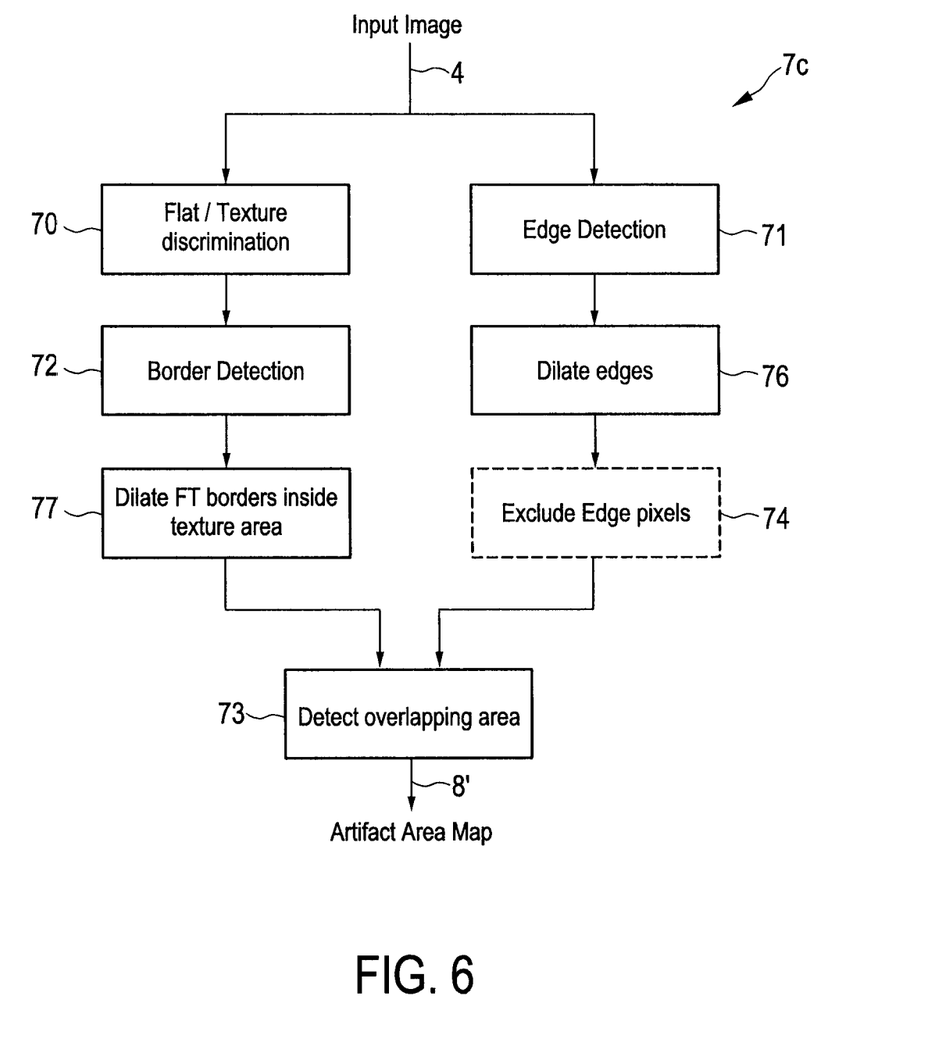

In addition, the artifacts are located close to a (strong) edge. The idea for the detection of the potential artifact area(s) according to a further embodiment of the present invention is to find texture regions that are on the one hand located close to an edge and on the other hand to be found close to the transition from a texture to a flat area, i.e. close to the border position. This idea is illustrated by the diagram shown in FIG. 5 and the schematic block diagram depicted in FIG. 6 showing a further embodiment 7c of a corresponding coding artifact detection unit 7.

In this embodiment 7c a (optional) discrimination unit 70 is provided which discriminates flat areas from texture areas, which information is then used in the border position detector 72 to detect the border 14 between the flat area 13 and the texture area 12. Further, the edge position 11 is detected as explained above in the edge position detector 71. The detected edge position(s) 11 is (are) dilated in an edge position dilation unit 76 to an edge area 18 that is large enough to include also the ringing artifacts. Also the detected border position 14 between the flat area 12 and the texture area 13 is dilated in a border position dilation unit 77 to a dilated border area 19 inside the texture area 12, which dilated border area 19 is large enough to include the ringing artifacts positioned near to this border position 14.

The overlapping region of the dilated edge area 18 and the dilated border area 19, which overlap is determined by the artifact area definition unit 73, then includes a big part of the ringing artifacts and mosquito noise that are present in the image. Preferably, in addition the pixel positions that are located on the edge 10 and very close to the edge position 11 (i.e. the pixel positions in an excluded edge area 16) are excluded from the this overlapping area or from the dilated edge area 18 by the excluded edge area definition unit 74, before the overlapping area is determined as the artifact area 15'.

For the realization of the flat vs. texture (FT) discrimination and border position determination in units 70, 72 several methods can be used without defining the edge regions, setting the pixel values of the flat area 12 to 0 and the pixel values of the texture area 13 to 1. The border position 14 of this region is then detected by calculating the difference of neighboring pixel values, wherein a difference different from 0 is interpreted as a border position 14.

Figure 7A:
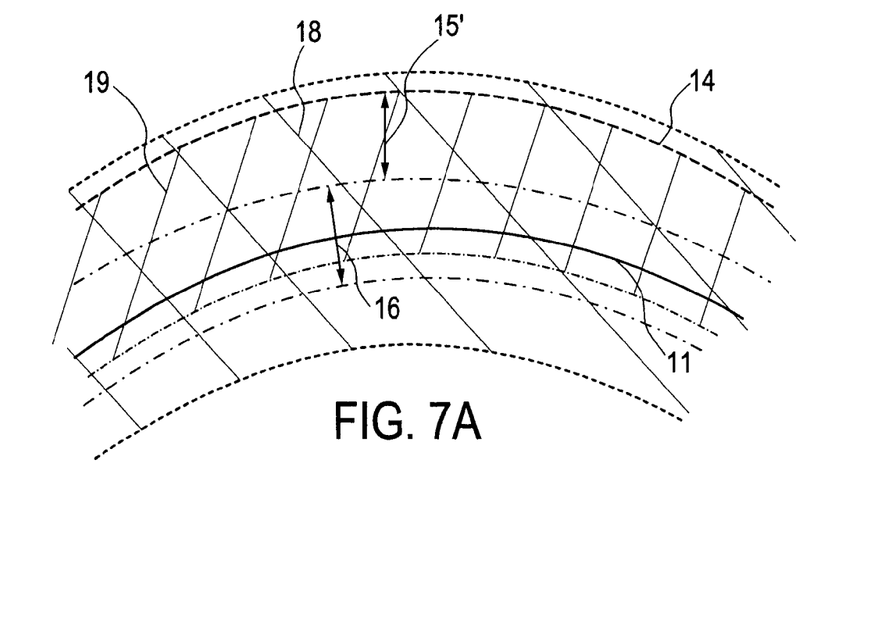
FIG. 7 shows top views on excerpt from images illustrating the various areas defined according to a further embodiment of the present invention, FIG. 8 schematically shows a fourth embodiment of an apparatus for detecting coding artifacts according to the present invention, and FIG. 9 schematically shows a fifth embodiment of an apparatus for detecting coding artifacts according to the present invention.

For the determination of the dilated border area various embodiments exist. This is illustrated in the diagrams shown FIG. 7 showing top views of an excerpt of a two-dimension image having an edge. In the a first embodiment illustrated in FIG. 7A said dilated border area 19 is defined by defining a block of a number of dilated border area pixels on the side of the border pixels (of the detected border position 14) facing the detected edge position 11, in particular on the side of each border pixel of the detected border position 11, and by including the dilated border area pixels into said dilated border area 19. For instance, in an embodiment, a N×N block area inside the texture area 12 located next to the FT border pixel (i.e. the border position 14) is defined as dilated border area 19.

Figure 7B:
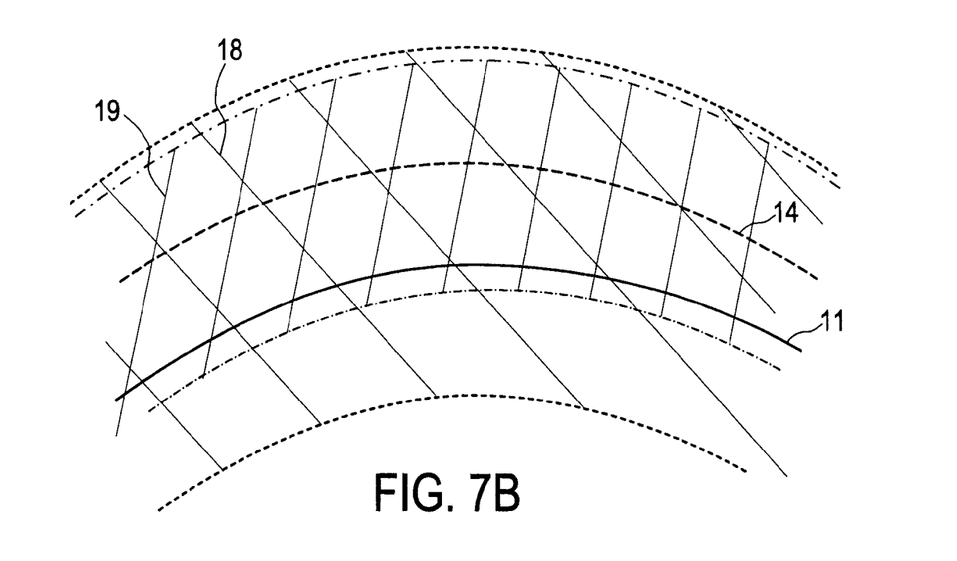

In a second embodiment illustrated in FIG. 7B said dilated border area is defined 19 by defining a block of a number of dilated border area pixels around the border pixels of the detected border position 14, in particular around each border pixel of the detected border position 14, and by including the dilated border area pixels into said dilated border area 19.

For the edge detection a known Canny edge detector can be used. The gradient threshold used in this method defines the strength of the edges around that the artifacts shall be detected. In general a high threshold level is prone to miss important edge information, while a low threshold level is prone to have many false positives. While generally a global threshold value can be assigned and used, a threshold level globally and optimally fitting all input material is generally not available. Therefore, the threshold level is generally matched to the quality level of the input material, which can be derived e.g. from bitrate, resolution, noise level or coding parameter of the input material.

Said dilated edge area 18 is preferably defined by defining a block of a number of dilated edge area pixels around the edge pixels of the detected edge position 11, in particular around each edge pixel of the detected edge position 11, and by including the dilated edge area pixels into said dilated edge area 18. For instance, around every pixel position of the edge position 11 a M×M block area is defined as dilated edge area 18. This is also depicted in FIGS. 7A, 7B.

Preferably, an inner R×R block area, i.e. the excluded edge area 16, is excluded from the dilated edge area 18 for subsequent determination of the artifact area 15' (which is only shown in FIG. 7A for the sake of clarity of these figures). Said excluded edge area 16 is generally defined by defining a block of a number of excluded edge area pixels around the edge pixels of the detected edge position 11, in particular around each edge pixel of the detected edge position 11, and by including the excluded edge area pixels into said excluded edge area 16. However, other methods for determining the excluded edge area 16 may also be provided, e.g. by finding both ends 17 of the edge 10 and defining the area in between both ends 17 as the excluded edge area 16.

The size of M should be selected depending on the size of the DCT blocks used for compression of the image to include the maximum distance of the artifacts to the edge. As the DCT block size is, for instance, 8×8 for default, the maximum distance in horizontal direction of the artifacts coming from the compression should be 7, so a reasonable block size for dilating the edge region is 15×15 to include all possible ringing artifacts in this example. The size of R can, for instance, be set to 3 in order not to exclude probable ringing artifacts but also to not select the edge. The maximum distance between the border position and the farest artifact should also be around 7, so a reasonable block size for the dilation of the FT-border is around 15×15 in this example.

After selecting these areas, the overlapping area between the dilated edge area 19 (minus the excluded edge area 16) and the dilated border area 19 is detected, and the pixel positions inside this overlapping area are assigned to the artifact area 15'.

Using the proposed method it is possible to detect areas where the probability of occurrence for clearly visible ringing artifacts and mosquito noise is very high. As there is no direct detection of the specific artifacts, no guarantee is, however, given that there are ringing artifacts to be found in this area. Particularly for strongly compressed images a big part of the clearly visible ringing artifacts and strong mosquito noise can be found inside of the detected artifact area detected with the proposed method and apparatus. Also the most parts of the "real" details can be excluded from being defined as ringing artifacts and mosquito noise, as only the detected details that are located close to an edge and an FT border are defined as ringing artifacts/mosquito noise. For DCT-coded and strongly compressed images the assumptions made for defining the artifact area according to the proposed method are fulfilled for a big part of natural images. Hence, the detected artifact area can be used e.g. to adapt a filter for filtering ringing artifacts and mosquito noise as proposed in the embodiment of the apparatus shown in FIG. 1.

Figure 8:
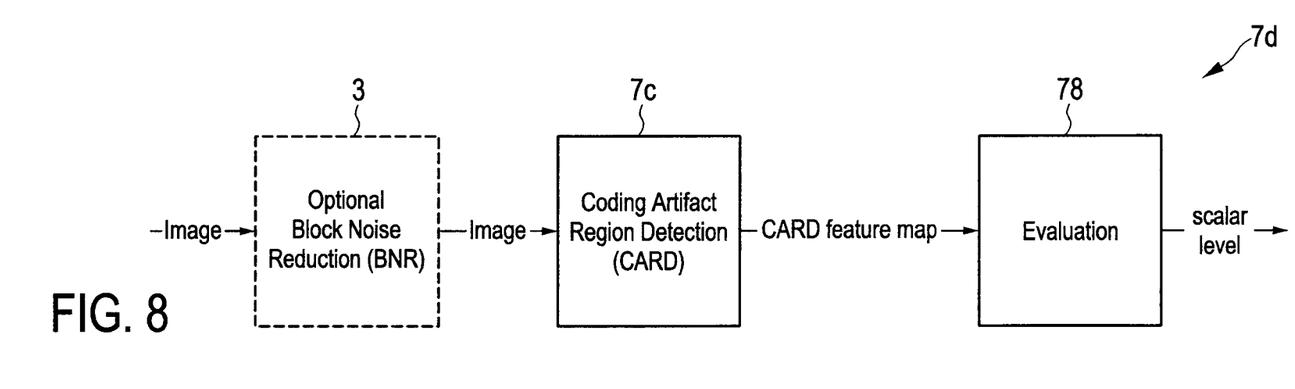

A further exemplary embodiment of an apparatus 7d for detecting coding artifacts in an image is schematically shown in FIG. 8. In this embodiment an evaluation unit 78 is provided in addition to an embodiment of the detection unit, e.g. the embodiment 7c (or 7a or 7b) as explained above. This evaluation unit 78 transforms the output information of the detection unit 7c, which in this embodiment is an artifact location information, in particular a scalar image map comprising binary artifact indicator values, said artifact location information indicating the one or more areas of the image defined as artifact area, into a single scalar level, representing the amount of artifact areas. This could be a simple counter for the number of suspected artifact pixels in the image, or relative to the total amount of pixels in the image, or another transformation of the two-dimensional map into a scalar value. The scalar value could, for example, be a percentage value between 0% and 100%, with the extreme cases that 0% means that there are no coding artifact areas in the image, and 100% means that the whole image was detected as coding artifact area.

Figure 9:
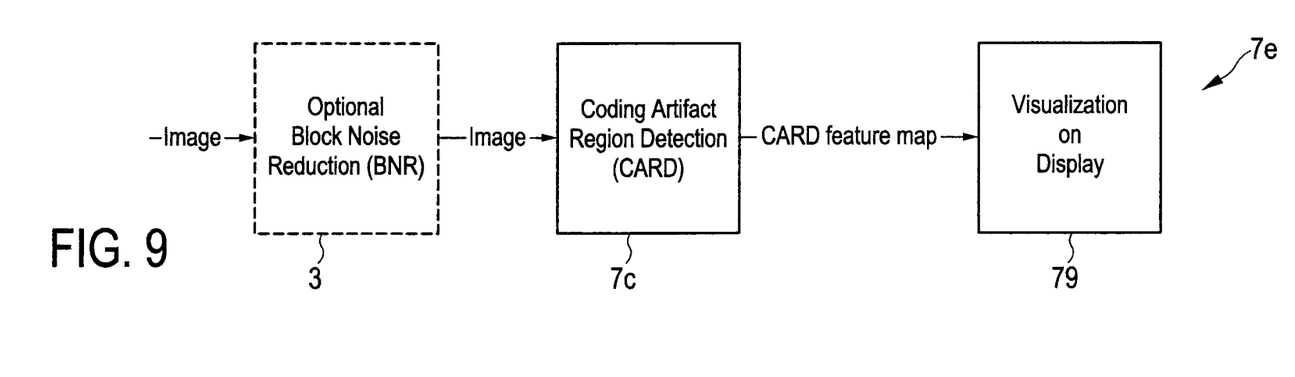

A further exemplary embodiment of an apparatus 7e for detecting coding artifacts in an image is schematically shown in FIG. 9. A visualization unit 79 is provided for showing the artifact location information on a display, e.g. a computer display, TV screen, printer or other visual output. The displayed information could be a black-and-white image, a color overlay on the original image, or any other visualization of the artifact location information (e.g. the two-dimensional feature map).

In certain embodiment described above, e.g. with reference to FIG. 1, a mosquito noise reduction and/or deringing filter 5 is provided, which can also be regarded or replaced by a regularizer, which smoothes the filtered image, which may apply a spatial regularization, a temporal regularization or a spatio-temporal (or 3D) regularization.

The regularization process introduces a smoothing along the main spatial direction, i.e. along edges to reduce the variations along this direction. Here, the term "regularization" is intended to refer to a harmonization of the image impression by approximation with an image model. The term "total variation" denotes the total sum of the absolute values of the gradients in an image which defines the total variation of the image. It is assumed that of all possible variants of an image the one with the lowest total variation is optimal. In the optimal case this leads to an image model, where the only variations stem from edges.

In a spatio-temporal or a pure temporal regularization, the processing is based on pixels of the actual frame and pixels from previous and/or successive frames. In case of motion, the pixels belonging to the same object are shifted from frame to frame. Thus, motion estimation can be required to track this motion (shift) for processing of pixels sharing the same information in consecutive frames.

More details and preferred embodiments of such a regularization filter are described in the above mentioned and herein incorporated European patent application 09 154 206.8 and in U.S. patent application Ser. No. 12/715,854.

The present invention may be used in all devices, systems and methods where coding artifacts, in particular ringing artifacts and mosquito noise, shall be detected and/or reduced. Hence, the proposed method and apparatus for detecting coding artifacts may be implemented in all kinds of devices for processing and/or displaying images, in particular in a camera, TV-set, computer, broadcast unit or video player or all similar devices related to a certain extent to image generation, coding, decoding or processing.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for detecting coding artifacts in an image, comprising:
    filtering, with circuitry, the image with a block noise filter to at least reduce block noise in the image;
    detecting, with the circuitry, an edge position of an edge in said image after filtering with the block noise filter;
    detecting, with the circuitry, a border position of a border between a texture area and a flat area in said image after filtering with the block noise filter;
    defining, with the circuitry, the area between said edge position and said border position as artifact area potentially comprising coding artifacts;
    displaying artifact location information corresponding to the coding artifacts on a display, the artifact location information including a scalar image map;
    defining a dilated edge area at least on the side of the detected edge position facing the detected border position, in particular on both sides of the detected edge position;
    defining a dilated border area at least on the side of the detected border position facing the detected edge position, in particular on both sides of the detected border position; and
    defining the overlapping area of said dilated edge area and said dilated border area between said edge position and said border position as said artifact area.

2. The method as claimed in claim 1, wherein said dilated edge area is defined by defining a block of a number of dilated edge area pixels around the edge pixels of the detected edge position, including an area around each edge pixel of the detected edge position, and by including the dilated edge area pixels into said dilated edge area.

3. The method as claimed in claim 2, further comprising:
    defining an excluded edge area between the detected edge position and the detected border position, said excluded edge area covering the area from the detected edge position to the end of the corresponding edge, and
    excluding said excluded edge area from said dilated edge area.

4. The method as claimed in claim 3, wherein said excluded edge area is defined by defining a block of a number of excluded edge area pixels around the edge pixels of the detected edge position, including an area around each edge pixel of the detected edge position, and by including the excluded edge area pixels into said excluded edge area.

5. The method as claimed in claim 1, wherein said dilated border area is defined by defining a block of a number of dilated border area pixels on the side of the border pixels facing the detected edge position, including on the side of each border pixel of the detected border position, and by including the dilated border area pixels into said dilated border area.

6. The method as claimed in claim 1, wherein said dilated border area is defined by defining a block of a number of dilated border area pixels around the border pixels of the detected border position, an area around each border pixel of the detected border position, and by including the dilated border area pixels into said dilated border area.

7. The method as claimed in claim 1, further comprising:
    defining an excluded edge area between the detected edge position and the detected border position, said excluded edge area covering the area from the detected edge position to the end of the corresponding edge; and
    excluding said excluded edge area from said artifact area.

8. The method as claimed in claim 1,
    further comprising generating the artifact location information and the scalar image map comprising binary artifact indicator values, said artifact location information indicating the one or more areas of the image defined as artifact area.

9. The method as claimed in claim 8, further comprising evaluating said artifact location information to generate a scalar artifact percentage information indication the percentage of the image containing coding artifacts.

10. An apparatus for detecting coding artifacts in an image, comprising:
    circuitry configured to
        block filter the image to reduce block noise therein,
        detect an edge position of an edge in said image after block filtering,
        detect a border position of a border between a texture area and a flat area in said image after block filtering,
        define the area between said edge position and said border position as artifact area potentially comprising coding artifacts, display artifact location information corresponding to the coding artifacts on a display, the artifact location information including a scalar image map, define a dilated edge area at least on the side of the detected edge position facing the detected border position, the dilated area being defined on both sides of the detected edge position, define a dilated border area at least on the side of the detected border position facing the detected edge position, the dilated border area being defined on both sides of the detected border position, and define the overlapping area of said dilated edge area and said dilated border area between said edge position and said border position as said artifact area.

11. A method for reducing coding artifacts in an image according to claim 1, further comprising:

reducing coding artifacts in image after block filtering by applying mosquito noise reduction and/or deringing to only the detected artifact areas of the image.

12. An apparatus for reducing coding artifacts in an image according to claim 10, wherein the circuitry is further configured to:

reduce coding artifacts in said image after block filtering by applying a step of mosquito noise reduction and/or deringing to only the detected artifact areas of the image.

13. A non-transitory computer-readable medium encoded with computer readable instructions thereon that, when executed by a computer, cause the computer to perform a method according to claim 1.

14. An apparatus for detecting coding artifacts in an image, comprising:

means for block filtering the image to reduce block noise therein;

first detection means for detecting an edge position of an edge in said image after block filtering;

second detection means for detecting a border position of a border between a texture area and a flat area in said image after block filtering;

defining means for defining the area between said edge position and said border position as artifact area potentially comprising coding artifacts;

means for displaying artifact location information corresponding to the coding artifacts on a display, the location artifact information including a scalar image map;

means for defining a dilated edge area at least on the side of the detected edge position facing the detected border position, in particular on both sides of the detected edge position;

means for defining a dilated border area at least on the side of the detected border position facing the detected edge position, in particular on both sides of the detected border position; and means for defining the overlapping area of said dilated edge area and said dilated border area between said edge position and said border position as said artifact area.

15. The apparatus for reducing coding artifacts in an image according to claim 14, further comprising:

means for reducing coding artifacts in said image after block filtering by applying mosquito noise reduction and/or deringing to only the detected artifact areas of the image.

16. A device for processing and/or displaying images comprising circuitry to perform the method claim 1.

17. The device according to claim 16, wherein the device is one of a camera, a TV set, a computer, a broadcasting unit and a video player.

* * * * *